(12) United States Patent
Kadle et al.

(10) Patent No.: US 6,837,061 B2
(45) Date of Patent: Jan. 4, 2005

(54) HVAC SYSTEM SHUTDOWN SEQUENCE

(75) Inventors: Prasad S. Kadle, East Amherst, NY (US); James A. Baker, Williamsville, NY (US); Mahmoud Ghodbane, Lockport, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/465,135

(22) Filed: Jun. 19, 2003

(65) Prior Publication Data

US 2004/0003607 A1 Jan. 8, 2004

Related U.S. Application Data

(60) Provisional application No. 60/393,271, filed on Jul. 2, 2002.

(51) Int. Cl.[7] ............................ G05D 23/32; F25B 41/00
(52) U.S. Cl. ............................ 62/158; 62/149; 62/174
(58) Field of Search ............................ 12/158, 174, 498, 12/149, 228.1, 77, 217

(56) References Cited

U.S. PATENT DOCUMENTS

| | | | |
|---|---|---|---|
| 5,630,323 A | * | 5/1997 | Niijima et al. ............... 62/158 |
| 5,660,051 A | * | 8/1997 | Sakakibara et al. ........... 62/133 |
| 5,946,939 A | | 9/1999 | Matsushima et al. |
| 6,397,613 B1 | * | 6/2002 | Izawa et al. ............... 62/196.4 |
| 6,505,478 B1 | | 1/2003 | Cousineau et al. |

FOREIGN PATENT DOCUMENTS

| | | |
|---|---|---|
| EP | 0768198 | 4/1997 |
| EP | 0788909 | 8/1997 |
| EP | 0842799 | 5/1998 |
| EP | 0872693 | 10/1998 |

* cited by examiner

*Primary Examiner*—Marc Norman
(74) *Attorney, Agent, or Firm*—Patrick M. Griffin

(57) ABSTRACT

A first solenoid-operated, discharge-line control valve (26) is moved between open and closed positions to control fluid flow in the discharge fluid line (18) between the compressor (12) and the condenser (14). A second solenoid-operated, liquid-line control valve (28) is moved between open and closed positions to control fluid flow in the liquid fluid line (20) between the condenser (14) and the evaporator (16). A controller (36) closes one of the flow control valves (26, 28) a period of time before closing the other flow control valve (26, 28) and shuts down the compressor (12) sequentially with the flow control valves (26, 28).

6 Claims, 1 Drawing Sheet

HVAC SYSTEM SHUTDOWN SEQUENCE

RELATED APPLICATION

This application claims the priority of provisional application No. 60/393,271 filed Jul. 2, 2002.

FIELD OF THE INVENTION

The subject invention relates to an air conditioning system for a vehicle, frequently referred to as a heating, ventilating and air conditioning (HVAC) system.

BACKGROUND OF THE INVENTION

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, and a suction fluid line interconnecting the evaporator and the compressor. Also, such systems utilize various valve arrangements for controlling refrigerant flow through the system during operation and during shutdown and/or in response to a leak of refrigerant in the system. In addition, an accumulator/dehydrator is frequently disposed in the suction line for accumulating refrigerant, or a receiver/drier disposed in the liquid line for storing refrigerant.

Past experience and recent studies demonstrate that at low load conditions, when the variable displacement compressor is operating at part stroke, refrigerant is trapped in the low side of the system, particularly in the evaporator. Minimizing this resident refrigerant will allow the system to be ready for any unforeseen events. One of the ways of minimizing this resident refrigerant is to minimize the internal volume of the evaporator. This entails proper design of the evaporator for low flow conditions. Another key factor in this design is to have very little volume at the bottom of the evaporator. This is particularly true of the U-channel evaporator that has tanks only on one side. These tanks are located at the top of the evaporator preventing any pooling of liquid refrigerant at the bottom of the evaporator.

Despite the efforts of minimization of charge resident in the evaporator, under certain conditions with a variable compressor, some refrigerant that is not actively participating in the heat transfer process stays resident in the evaporator. The reason for this is that the system has excess refrigerant to handle transient conditions and loss of charge over time. At low loads, the compressor de-strokes to match the needs of the system. Thus, the pumping capacity is reduced and the velocities of the refrigerant fall within the system. If the velocity is not high enough within the evaporator to overcome the gravitational effect, the liquid refrigerant tends to pool at the bottom. This is especially true of evaporators that have tanks at the bottom. This liquid refrigerant pooled in the evaporator has no "pull" from either the compressor or the evaporation process because of system low loads and thus stays resident in the evaporator, pull being the natural migration of refrigerant to the coolest areas of the system. Accordingly, there is a constant need for methods to minimize the pooling of refrigerant in the evaporator.

SUMMARY OF THE INVENTION AND ADVANTAGES

The subject invention relates to such an air conditioning system wherein the closing of the flow control valves and the shutting down of the compressor may be in any one of various different sequences in response to various different inputs.

By sequencing the operation of the air conditioning system in response to various different inputs, the refrigerant in the evaporator is minimized for the operating condition.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
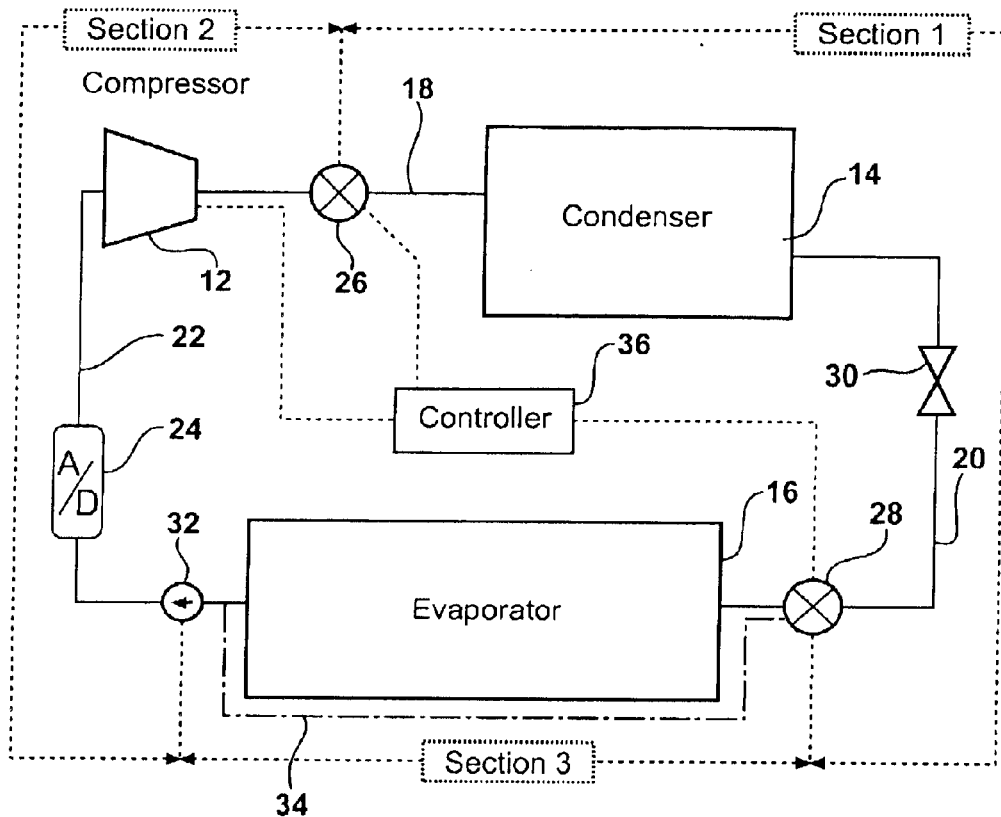
FIG. 1 is a schematic view of an air conditioning system employing the subject invention.
Figure 2:
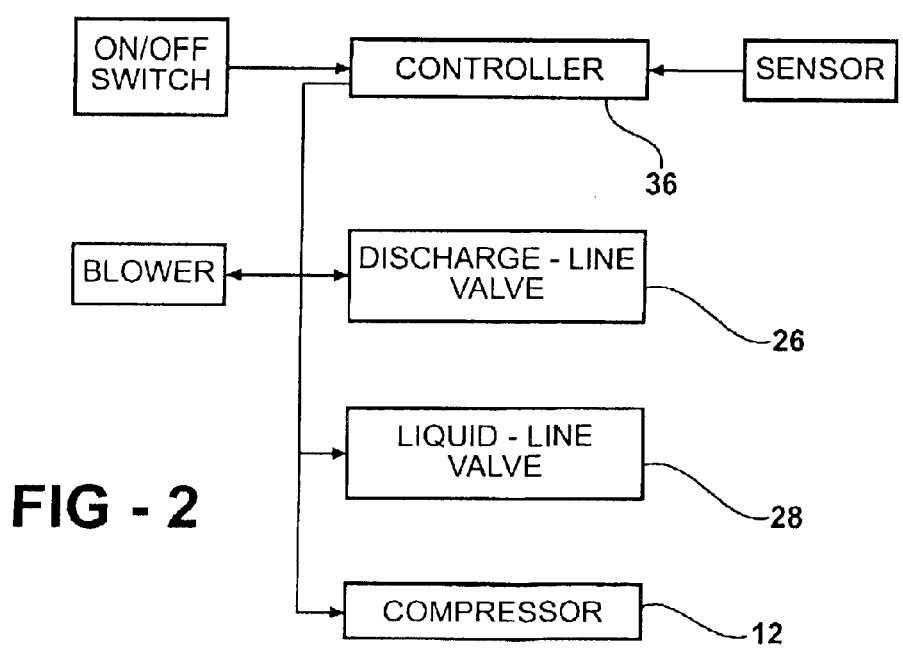
FIG. 2 is a block diagram of an air conditioning system employing the subject invention.

As alluded to above the subject invention relates to an air conditioning system for a vehicle that comprises a compressor 12 for compressing a refrigerant, a condenser 14 for condensing the refrigerant, and an evaporator 16 for evaporating the refrigerant. Of course, a discharge fluid line 18 interconnects the compressor 12 and the condenser 14, while a liquid fluid line 20 interconnects the condenser 14 and the evaporator 16, and a suction fluid line 22 interconnects the evaporator 16 and the compressor 12. As will be appreciated, since the drawings are schematic, the components are not proportional to actual components.

As is well known in the art, an accumulator/dehydrator (A/D) 24 is disposed in the suction fluid line 22 for accumulating and dehydrating refrigerant.

In addition, various flow control valves movable between open and closed positions are included for controlling the flow of refrigerant through the system. A first solenoid-operated, discharge-line control valve 26 is moved between open and closed positions to control fluid flow in the discharge fluid line 18 between the compressor 12 and the condenser 14. A second solenoid-operated, liquid-line control valve 28 is moved between open and closed positions to control fluid flow in the liquid fluid line 20 between the condenser 14 and the evaporator 16. A thermal expansion device 30 is also disposed in the liquid fluid line 20 between the condenser 14 and the evaporator 16. A check valve 32 is disposed in the suction fluid line 22 between the evaporator 16 and the accumulator/dehydrator A/D 24. In this configuration, the expansion device is normally an orifice tube but generally could be replaced by any expansion device such as a capillary tube, TXV, etc. Alternatively, the liquid-line valve 28 could be a by-pass valve for bypassing the flow through a by-pass line 34 and around the evaporator 16.

These valves divide the system into three sections with section one extending between the first 26 and second 28 solenoid valves, section two extending between the check valve 32 and the first solenoid valve 26, and section three extending between the valves on either side of the evaporator 16, i.e., the second solenoid valve 28 and the check valve 32. Accordingly, section three consists primarily of the evaporator 16. This section three serves to isolate the evaporator 16 in the "off" mode. In general, the vehicle sits idle for very long periods of time. In case of a leak out of the evaporator 16, this minimal charge will be released into the passenger compartment but will not pose any safety hazard because of the low internal volume of section three. The check valve 32 is provided to allow the flow of refrigerant out of the evaporator 16 and into the A/D 24 when the system is shut down. The A/D 24 has high internal volume and typically holds the reserve charge in the system. This reserve charge allows the system to operate without any loss of performance in transient situations. The A/D 24 would be strategically placed such that its integrity would not be breached in most collisions (typically between the engine and the dash). The system is separated into several sections to mitigate the leaks out of the system in a collision or a leak caused by corrosion, etc.

A controller 36 is included for sequencing the closing of the flow control valves 26, 28 and the compressor 12.

The closing of the flow control valves 26, 28, in effect, will compartmentalize the refrigerant into the three discrete sections labeled sections 1, 2 and 3 in FIG. 1, but referred to herein as one, two and three. The closing of these flow control valves 26, 28 is sequenced differently depending on the state of the vehicle just prior to the system shutting down.

Under the condition where the passenger turns off the A/C request switch, the compressor 12 is not shut off immediately. Instead, the first flow control valve 26 is shut down, allowing the compressor 12 to pump refrigerant out of the condenser 14 into the evaporator 16 and into the A/D 24. After a few seconds, the second flow control valve 28 is shut down allowing the "emptying" of the evaporator 16. After a few seconds the compressor 12 is turned off. Under this condition, most of the refrigerant is compartmentalized in section two. This sequence is possible with a fixed displacement compressor or an externally or controller 36 controlled variable compressor that is allowed to operate at a high stroke during the shutdown sequence. A pneumatic variable compressor can be tricked by the controller 36 to stay at a high stroke to allow it to remain at a high stroke during this sequence.

Of course, the same sequence can be followed for an electrically driven compressor that can run on even after the vehicle is shut down. In this case, the sequence is the same for an operator turning the system off as it is for shut down. For a belt-driven compressor, the sequence is different when the vehicle is shut down. When the vehicle shuts down, the A/C system and compressor 12 both shut down immediately and the system immediately shuts down the second flow control valve 28. After twenty (20) seconds or up to a minute later, the first flow control valve 26 is shut down. This allows the system to equalize from the high side to the low side. Generally, the reed valves in the compressor 12 prevent equalization into the A/D 24 but some leakage allows refrigerant flow into the compressor 12 and into section two.

In one embodiment, a sensor is added at the airside outlet of the evaporator 16. Strategic positioning of this sensor allows it to sense any leak of refrigerant from the evaporator 16. In this case, the sequence of events while the vehicle is running minimizes the leakage into the passenger compartment. The second flow control valve 28 is shut down immediately. At the same time, the blower speed is increased to full blower condition and the mode door inside the HVAC module is switched to outside air (OSA). This allows the quick dissipation of the minimal amount of refrigerant into the passenger compartment.

In a front-end collision situation (detected by the accelerometer—Airbag or other sensor), the flow control valves 26, 28 are immediately shut down keeping the refrigerant in the respective section that it was resident in at the time of the collision. The minimization of refrigerant in section one described earlier ensures the safety during this leakage situation The system includes a controller (36) for sequencing the closing of the flow control valves (26, 28) and shutting down the compressor (12). More specifically, the controller (36) closes the flow control valves (26, 28) and shuts down the compressor (12) in anyone of various different sequences in response to various different inputs. The controller (36) closes one of the flow control valves (26, 28) after a period of time, e.g., seconds, before closing the other flow control valve (26, 28) and shuts down the compressor (12) sequentially with the flow control valves (26, 28).

Accordingly, the invention provides a method of operating an air conditioning system comprising the steps of the closing of the flow control valves (26, 28) and shutting down the compressor (12) in any one of various different sequences in response to various different inputs, including closing one of the flow control valves (26, 28) a period of time before closing the other flow control valve (26, 28).

Obviously, many modifications and variations of the present invention are possible in light of the above teachings. The invention may be practiced otherwise than as specifically described within the scope of the appended claims.

What is claimed is:

1. An air conditioning system for a vehicle comprising:
   a compressor (12) for compressing a refrigerant,
   a condenser (14) for condensing the refrigerant,
   an evaporator (16) for evaporating the refrigerant and including a predetermined portion in which refrigerant pools,
   a discharge fluid line (18) interconnecting the compressor (12) and said condenser (14),
   a liquid fluid line (20) interconnecting said condenser (14) and said evaporator (16),
   a suction fluid line (22) interconnecting said evaporator (16) and said compressor (12),
   a discharge-line control valve (26) disposed in said discharge fluid line (18) between said compressor (12) and said condenser (14),
   a liquid-line control valve (28) disposed in said liquid fluid line (20) between said condenser (14) and said evaporator (16),
   a one-way check valve disposed in said suction fluid line (22) between said evaporator (16) and said compressor (12) for allowing one way flow from said evaporator to said compressor, and
   a controller (36) for closing one of the flow control valves (26, 28) a period of time before closing the other flow control valve (26, 28) and shutting down the compressor (12).

2. A system as set forth in claim 1 wherein said controller (36) is programmed for closing of the flow control valves (26, 28) and shutting down the compressor (12) in any one of various different sequences in response to various different inputs.

3. A system as set forth in claim 1 wherein said controller (36) is programmed for shutting down the compressor (12)2 sequentially with said flow control valves (26, 28).

4. A method of operating an air conditioning system of the type including a compressor (12) for compressing a refrigerant, a condenser (14) for condensing the refrigerant, an evaporator (16) for evaporating the refrigerant, a discharge fluid line (18) interconnecting the compressor (12) and the condenser (14) with a discharge-line valve (26) disposed in the discharge fluid line (18), a liquid fluid line (20) interconnecting the condenser (14) and the evaporator (16) with a liquid-line valve (28) disposed in the liquid fluid line (20), and a suction fluid line (22) interconnecting the evaporator (16) and the compressor (12), and a one-way check valve (32) disposed in the suction fluid line (22), said method comprising the steps of closing one of the flow control valves (26, 28) a period of time before closing the other flow control valve (26, 28) and shutting down the compressor (12).

5. A method as set forth in claim 4 including closing of the flow control valves (26, 28) and shutting down the compressor (12) in any one of various different sequences in response to various different inputs.

6. A method as set forth in claim 4 including shutting down the compressor (12) sequentially with said flow control valves (26, 28).

* * * * *